US012619893B2

(12) United States Patent
Namba et al.

(10) Patent No.: US 12,619,893 B2
(45) Date of Patent: May 5, 2026

(54) GENERATION APPARATUS, GENERATION METHOD, AND RECORDING MEDIUM

(71) Applicant: Hitachi, Ltd., Tokyo (JP)

(72) Inventors: Hiroyuki Namba, Tokyo (JP); Masaki Hamamoto, Tokyo (JP); Masashi Egi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 901 days.

(21) Appl. No.: 17/939,778

(22) Filed: Sep. 7, 2022

(65) Prior Publication Data

US 2023/0267351 A1      Aug. 24, 2023

(30) Foreign Application Priority Data

Feb. 18, 2022    (JP) ................................. 2022-023849

(51) Int. Cl.
*G06N 5/045*        (2023.01)
*G06F 18/2132*      (2023.01)
(52) U.S. Cl.
CPC ....... *G06N 5/045* (2013.01); *G06F 18/21322* (2023.01); *G06F 18/21326* (2023.01)
(58) Field of Classification Search
CPC .............. G06N 5/045; G06F 18/21322; G06F 18/21326
See application file for complete search history.

(56) References Cited

U.S. PATENT DOCUMENTS 8,924,338 B1 * 12/2014 Sheng ................. G06F 16/1873
                                                706/52
10,824,959 B1 * 11/2020 Chatterjee .............. G06N 5/025
                        (Continued)

FOREIGN PATENT DOCUMENTS

JP        2016004525 A  *  1/2016
JP        2020042346 A      3/2020

OTHER PUBLICATIONS

Ding, Xianfeng et al. "A New Production Prediction Model Based on Taylor Expansion Formula", Dec. 2, 2018, Mathematical Problems in Engineering, pp. 1-12 (Year: 2018).*
                        (Continued)

*Primary Examiner* — Haimei Jiang
*Assistant Examiner* — Thomas Bernard Lane
(74) *Attorney, Agent, or Firm* — PROCOPIO, CORY, HARGREAVES & SAVITCH LLP

(57)                    ABSTRACT

A generation apparatus is configured to access a set of pieces of learning data each being a combination of a value of an explanatory variable and a value of an objective variable, a function family list including, of functions each indicating a physical law and an attribute of each of the functions, at least the functions, and search range limiting information for limiting a search range of the function family list, wherein the processor is configured to execute: first generation processing of generating a first prediction expression by setting a first parameter for the explanatory variable to a first function included in the function family list; first calculation processing of calculating, based on the search range limiting information, a first conviction degree relating to the first prediction expression; and first output processing of outputting the first prediction expression and the first conviction degree.

20 Claims, 8 Drawing Sheets

| # | PREDICTION EXPRESSION | PRECISION | COMPLEXITY | CONVICTION DEGREE | TAG |
|---|---|---|---|---|---|
| 1 | 0.1x_2+0.14x_3+5 | 0.11 | 3 | 2 | CHEMISTRY |
| 2 | 255sin(0.00043x_2 +0.3x_3+28) | 0.10 | 4 | 0 | ELECTRICITY | x_1: MANUFACTURING DATE, x_2: WATER, x_3: CEMENT

CANDIDATE NUMBER [2]

SEARCH FINISH BUTTON

PRECISION IMPROVEMENT BUTTON

| # | PREDICTION EXPRESSION | PRECISION | COMPLEXITY | CONVICTION DEGREE | TAG |
|---|---|---|---|---|---|
| 1 | 255sin(0.00043x_2 +0.3x_3+28) +cos(x_1) | 0.11 | 3 | 2 | CHEMISTRY |
| 2 | 255sin(0.00043x_2 +0.3x_3+28) +exp(x_2+x_3) | 0.10 | 4 | 0 | ELECTRICITY |

700 800 701 702 703 704 705 706 801 802 803 804

(56)　　　　　References Cited

U.S. PATENT DOCUMENTS

| | | | |
|---|---|---|---|
| 2015/0006151 A1* | 1/2015 | Iwakura | G06F 40/216 |
| | | | 704/9 |
| 2020/0082943 A1 | 3/2020 | Sakaguchi | |
| 2020/0394528 A1* | 12/2020 | Makino | G06N 5/01 |
| 2021/0042770 A1* | 2/2021 | Miyata | G06Q 30/0202 |

OTHER PUBLICATIONS

Crabbe et al., "Learning outside the Black-Box: The pursuit of interpretable models" 34th Conference on Neural Information Processing Systems (NeurIPS 2020), Vancouver, Canada, vol. 33, 17838-17849.

* cited by examiner

100

| FUNCTION FAMILY | TAG |
|---|---|
| X | CHEMISTRY |
| sin X | ELECTRICITY |
| log X | SENSE OF HUMAN |
| exp X | FINANCE, ELECTRICITY, CHEMISTRY |
| X^2+X+1 | MECHANICS |
| ⋮ | ⋮ |

| TYPE | ELEMENT | CONVICTION LEVEL |
|---|---|---|
| FUNCTION FAMILY | X | 1 |
| TAG | CHEMISTRY | 1 |
| ⋮ | ⋮ | ⋮ |

600

700

| # | PREDICTION EXPRESSION | PRECISION | COMPLEXITY | CONVICTION DEGREE | TAG |
|---|---|---|---|---|---|
| 1 | $0.1x\_2+0.14x\_3+5$ | 0.11 | 3 | 2 | CHEMISTRY |
| 2 | $255\sin(0.00043x\_2+0.3x\_3+28)$ | 0.10 | 4 | 0 | ELECTRICITY |

701  702  703  704  705  706 x_1: MANUFACTURING DATE, x_2: WATER, x_3: CEMENT 700  800

| 701 # | 702 PREDICTION EXPRESSION | 703 PRECISION | 704 COMPLEXITY | 705 CONVICTION DEGREE | 706 TAG |
|---|---|---|---|---|---|
| 1 | $0.1x\_2+0.14x\_3+5$ | 0.11 | 3 | 2 | CHEMISTRY |
| 2 | $255\sin(0.00043x\_2 +0.3x\_3+28)$ | 0.10 | 4 | 0 | ELECTRICITY | x_1: MANUFACTURING DATE, x_2: WATER, x_3: CEMENT

801
CANDIDATE NUMBER   2

802 — SEARCH FINISH BUTTON

803 — PRECISION IMPROVEMENT BUTTON

| 701 # | 702 PREDICTION EXPRESSION | 703 PRECISION | 704 COMPLEXITY | 705 CONVICTION DEGREE | 706 TAG |
|---|---|---|---|---|---|
| 1 | $255\sin(0.00043x\_2 +0.3x\_3+28) +\cos(x\_1)$ | 0.11 | 3 | 2 | CHEMISTRY |
| 2 | $255\sin(0.00043x\_2 +0.3x\_3+28) +\exp(x\_2+x\_3)$ | 0.10 | 4 | 0 | ELECTRICITY |

START

DETERMINE LEARNING DATA SET WITHIN REGION — S1101

DETERMINE REPRESENTATIVE POINT SET — S1102

START OF LOOP
(PROCESS EACH ELEMENT OF
REPRESENTATIVE POINT SET) — S1103

CALCULATE TAILER EXPANSIONS AT
REPRESENTATIVE POINT — S1104

CALCULATE ERROR OF EXPANSION COEFFICIENTS AND
SUBTRACT FROM CONVICTION DEGREE — S1105

END OF LOOP — S1106

END

GENERATION APPARATUS, GENERATION METHOD, AND RECORDING MEDIUM

CLAIM OF PRIORITY

The present application claims priority from Japanese patent application JP 2022-23849 filed on Feb. 18, 2022, the content of which is hereby incorporated by reference into this application.

BACKGROUND OF THE INVENTION

This invention relates to a generation apparatus and a generation method which generate a rule for predicting data, and a recording medium.

In a classification problem or a regression problem, there is known an issue of making a prediction rule consistent with knowledge of experts. For example, in a system which predicts strength of a product manufactured based on data relating to manufacturing conditions and manufacturing methods, when a prediction rule is not consistent with knowledge of experts, the system cannot be employed in a reliable manner. The knowledge of the experts is, for example, a physical characteristic that a specific explanatory variable and the strength are proportional to each other. As a technology relating to this issue, there exist, for example, JP 2020-42346 A, and Crabbe, J., Zhang, Y, Zame, W, and van der Schaar, M. (2020). "Learning outside the Black-Box: The pursuit of interpretable models." In Neural Information Processing Systems (NeurIPS 2020), Volume 33, 17838-17849.

A diagnosis support device as disclosed JP 2020-42346 A includes an identification part, an algorithm change part and a re-identification part. The identification part executes identification processing with medical information as an input, so as to output a first identification result and a first identification ground leading to the result. The algorithm change part changes an algorithm of the identification processing so as not to output the first identification ground, in response to a refusal instruction to the first identification ground. The re-identification part executes identification processing after the algorithm change with the medical information as an input so as to output a second identification result and a second identification ground leading to the result. The technology as disclosed in Crabbe, J., Zhang, Y, Zame, W, and van der Schaar, M. (2020). "Learning outside the Black-Box: The pursuit of interpretable models." In Neural Information Processing Systems (NeurIPS 2020), Volume 33, 17838-17849 is a technology for efficiently searching functions which are simple and can be understood by experts for a function which best fits data.

There is a case in which a learning model, that is, a prediction rule, in the classification problem or the regression problem is highly precise and simple, but is not consistent with knowledge of users, and hence cannot be relied on.

SUMMARY OF THE INVENTION

This invention has an object to increase consistency between a prediction rule and knowledge of a user.

An aspect of the disclosure in the present application is a generation apparatus, comprising: a processor configured to execute a program; and a storage device configured to store the program, the generation apparatus being configured to access a set of pieces of learning data each being a combination of a value of an explanatory variable and a value of an objective variable, a function family list including, of functions each indicating a physical law and an attribute of each of the functions, at least the functions, and search range limiting information for limiting a search range of the function family list, wherein the processor is configured to execute: first generation processing of generating a first prediction expression by setting a first parameter for the explanatory variable to a first function included in the function family list; first calculation processing of calculating, based on the search range limiting information, a first conviction degree relating to the first prediction expression generated through the first generation processing; and first output processing of outputting the first prediction expression and the first conviction degree calculated through the first calculation processing.

According to the representative embodiment of this invention, the consistency between the prediction rule and the knowledge of the user can be increased. Other objects, configurations, and effects than those described above are clarified by the following description of an embodiment.

BRIEF DESCRIPTION OF THE DRAWINGS

FIG. 8 is an explanatory diagram for illustrating an example of the display screen on the client terminal.

DETAILED DESCRIPTION OF THE PREFERRED EMBODIMENTS

First Embodiment

<Hardware Configuration Example of Computer>

Figure 1:
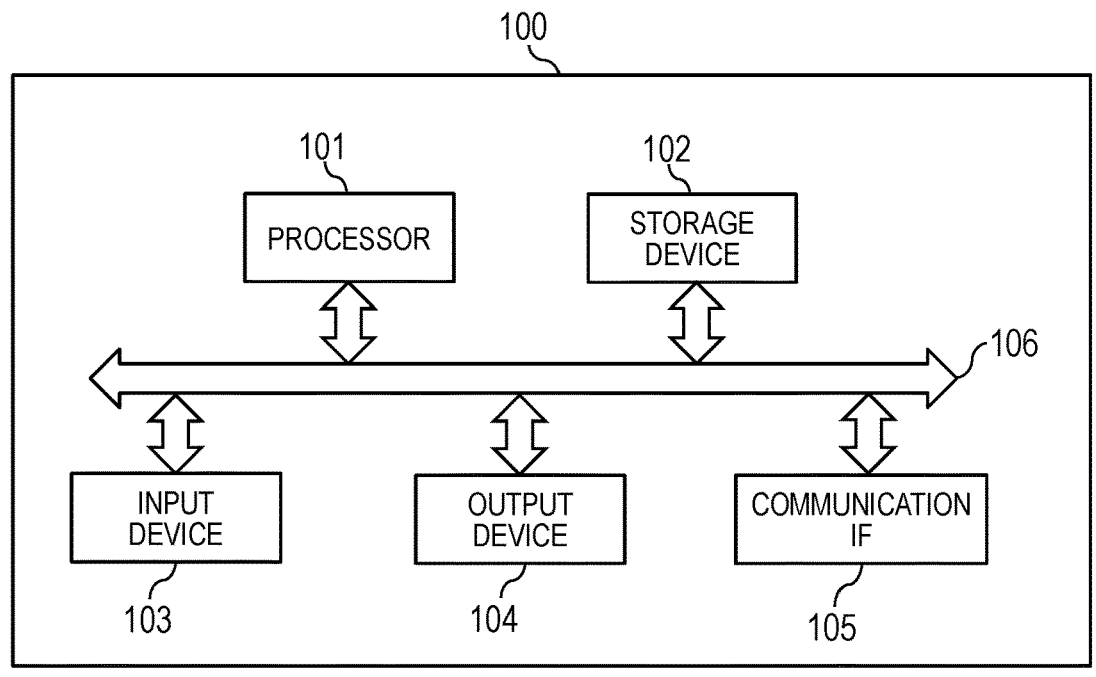
FIG. 1 is a block diagram for illustrating a hardware configuration example of a computer.

FIG. 1 is a block diagram for illustrating a hardware configuration example of a computer. A computer 100 includes a processor 101, a storage device 102, an input device 103, an output device 104, and a communication interface (communication IF) 105. The processor 101, the storage device 102, the input device 103, the output device 104, and the communication IF 105 are coupled to one another through a bus 106. The processor 101 is configured to control the computer 100. The storage device 102 serves as a work area for the processor 101. The storage device 102 is also a non-transitory or transitory recording medium configured to store various programs and various kinds of data. Examples of the storage device 102 include a read only memory (ROM), a random-access memory (RAM), a hard disk drive (HDD), and a flash memory. The input device 103 is configured to input data. Examples of the input device 103 include a keyboard, a mouse, a touch panel, a numeric keypad and a scanner. The output device 104 is configured to output data. Examples of the output device 104 include a display, a printer, and a speaker. The communication IF 105 is coupled to the network 110, and is configured to transmit and receive data.

<Learning Data>

Figure 2:
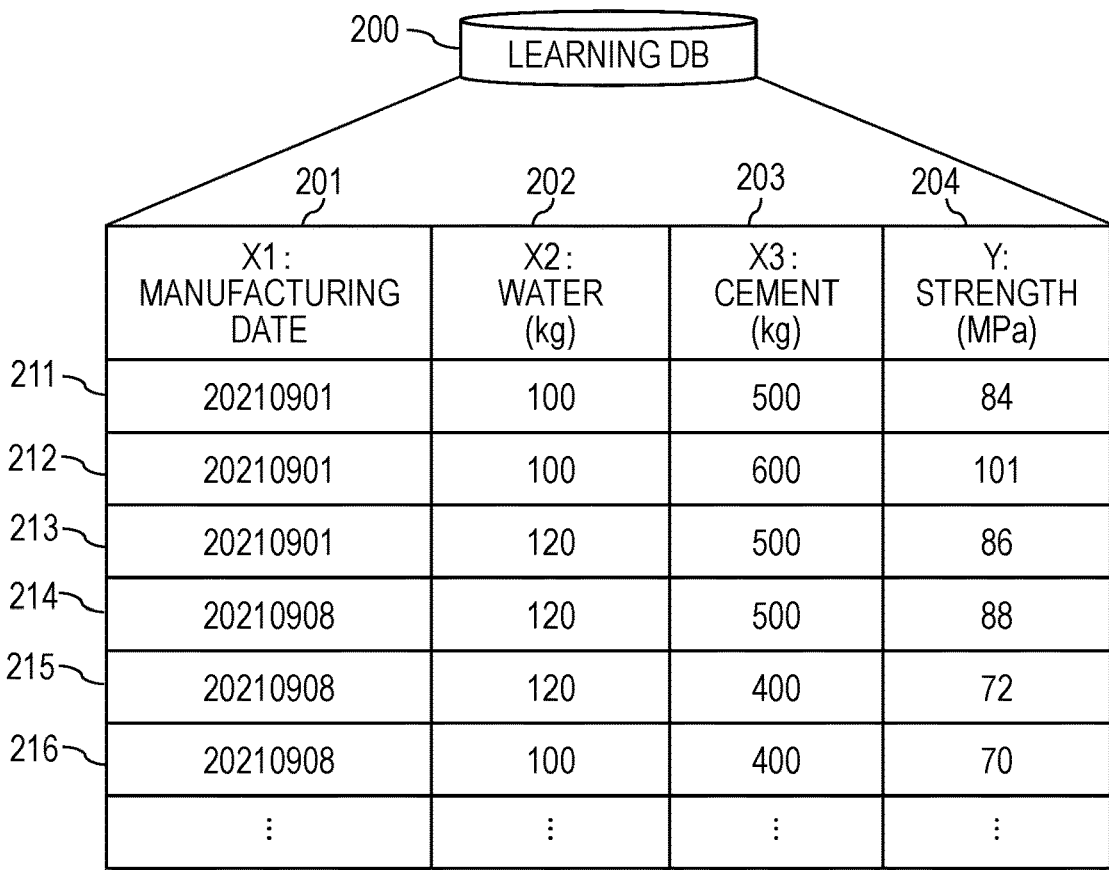
FIG. 2 is an explanatory diagram for illustrating an example of a learning DB in a first embodiment of this invention.

FIG. 2 is an explanatory diagram for illustrating an example of a learning DB in a first embodiment of this invention. A learning DB 200 includes one or more explanatory variables (in FIG. 2, as an example, three explanatory variables of a manufacturing date 201, water 202, and cement 203) and one objective variable (in FIG. 2, as an example, one objective variable of strength 204). For example, each entry of the learning DB 200 is learning data including, as a manufacturing condition, a manufacturing method, and a manufacturing result at the time when concrete was manufactured, the manufacturing date 201, the water 202, and the cement 203 representing explanatory variables X1 to X3, and the strength 204 representing an objective variable Y. In FIG. 2, the number of explanatory variables is three, but is only required to be one or more. It should be noted that when the explanatory variables X1 to X3 are not distinguished from one another, the explanatory variables X1 to X3 are referred to as "explanatory variables X." The manufacturing date 201 is a date of the manufacturing of concrete. The water 202 is an amount of water used on the manufacturing date 201. The cement 203 is an amount of cement used on the manufacturing date 201. The strength 204 is a numerical value indicating strength of the concrete manufactured on the manufacturing date 201.

Of entries 211 to 216 of the learning DB 200, the entry 211 on the first row indicates that the strength 204 of the concrete manufactured under a condition that the manufacturing date 201 is "Sep. 1, 2021," the water 202 is "100 (kg)," and the cement 203 is "500 (kg)" was "80 (MPa)." In the first embodiment, the objective variable Y is a continuous value, but, for example, may be a binary value (1 or 0) indicating whether or not the strength 204 is sufficiently high.

<Function Family List>

Figure 3:
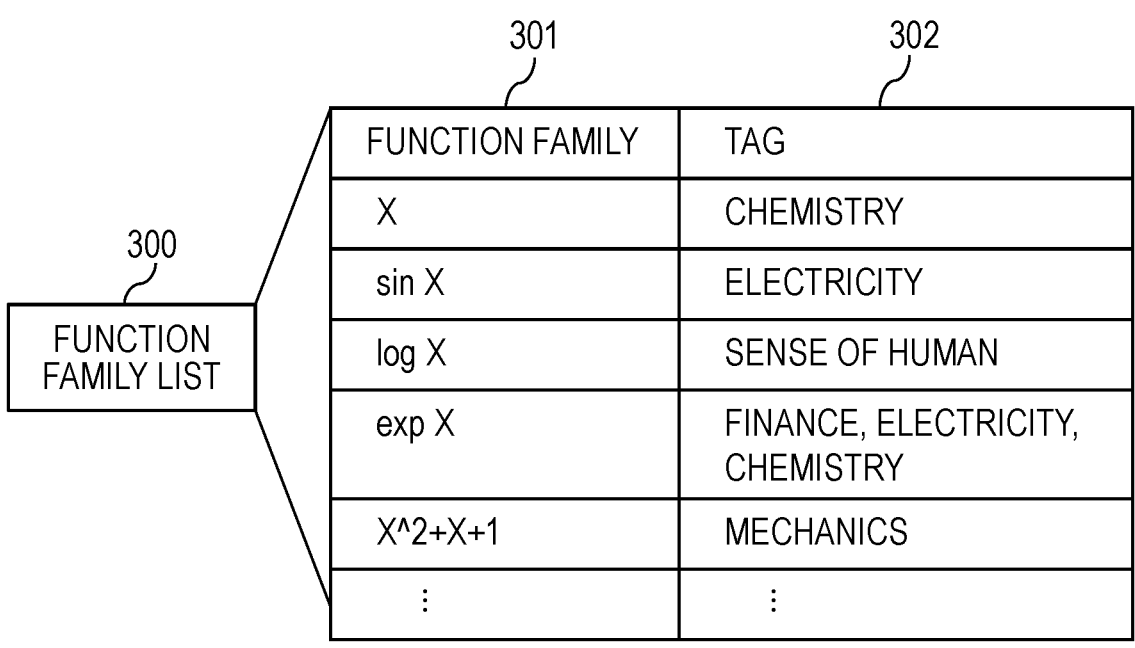
FIG. 3 is an explanatory diagram for illustrating an example of a function family list in the first embodiment.

FIG. 3 is an explanatory diagram for illustrating an example of a function family list in the first embodiment. A function family list 300 is a list of rows each including, of a function family 301 and a tag 302, at least the function family 301. In this case, the function family 301 is a set of functions representing a physical law. The function is a differentiable one-variable function such as (Y=) X and (Y=) sin X. One function family 301 has zero or more tags 302. The tag 302 is an attribute assigned to the function family 301.

Examples of the tag 302 include "electricity" indicating that the corresponding function family 301 can be a solution of an equation relating to an electromagnetic wave or an electric circuit. For example, an entry on the second row indicates that a tag 302 of "electricity" is assigned to a function family 301 of "sin X." The function family list 300 is stored in advance in the computer 100. Moreover, the function family list 300 may be set through operation input of a user.

<Search Range Limiting Information>

Figure 4:
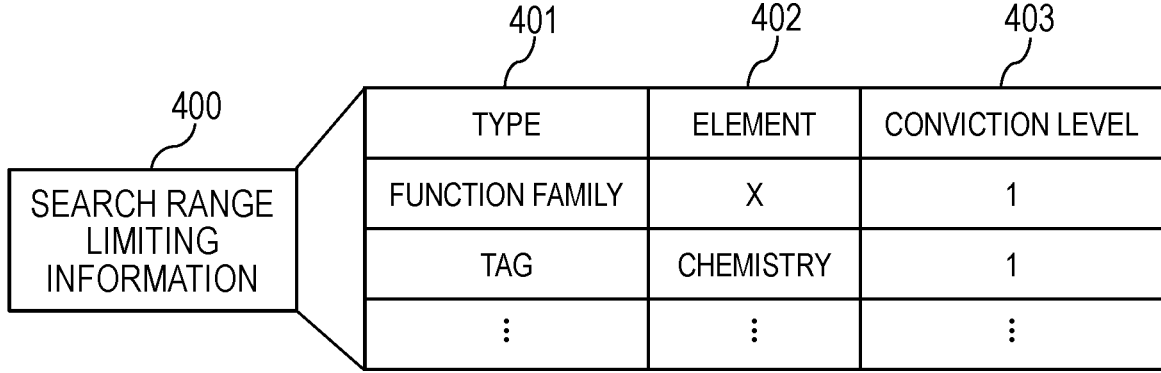
FIG. 4 is an explanatory diagram for illustrating an example of search range limiting information in the first embodiment.

FIG. 4 is an explanatory diagram for illustrating an example of search range limiting information in the first embodiment. Search range limiting information 400 is information for limiting a search range of a prediction expression, and is generated based on input information from the user. The search range limiting information 400 is a list of rows each including a type 401, an element 402, and a conviction level 403. In this case, the type 401 is any one of the function family 301, the tag 302, and a theoretical expression. The theoretical expression is described later in a second embodiment of this invention.

The element 402 is a value of the function family 301 or the tag 302 identified by the type 401 in the function family list 300. In an entry on the first row, the type 401 is the function family 301, and the corresponding element 402 is "X" (the value of the function family 301 in the entry on the first row of the function family list 300). Moreover, in an entry on the second row, the type 401 is the tag 302, and the corresponding element 402 is "chemistry" (the value of the tag 302 in the entry on the first row of the function family list 300).

The conviction level 403 is a real value indicating a level at which the user is convinced that the type 401 is the element 402. The conviction level 403 indicates that as the real value increases, the user is convinced more. The entry on the first row indicates that the conviction level 403 is "1" for the fact that the element 402 of the function family 301 being the type 401 is "(Y=) X." Moreover, an entry on the second row indicates that the conviction level 403 is "1" for the fact that the element 402 of the tag 302 being the type 401 is "chemistry." In other words, the case of FIG. 4 indicates that the fact that the function family 301 is "(Y=) X" and the fact that the tag 302 is "chemistry" are convincing at the levels equivalent to each other.

A value other than "1" can be set to the conviction level 403. The user can freely set the conviction level 403. When the conviction level 403 is set to a fixed value (such as "1") for any combination of the type 401 and the element 402, the column of the conviction level 403 is not required to exist. However, the computer 100 sets the conviction level 403 to a fixed value for any combination of the type 401 and the element 402, and uses the conviction level 403 for calculation of a conviction degree described later.

<Prediction Rule>

A prediction rule is a rule for predicting data such as the strength 204, and is expressed as Expression (1) for calculating a prediction value y of an objective variable Y when explanatory variables X are input.

$$y=0.1x2+0.14x3+5 \tag{1}$$

For example, the prediction value y of the objective variable Y is "85" when the explanatory variable X2 (=100) of the entry on the first row of the learning DB 200 of FIG. 2 is input to x2, and the explanatory variable X3 (=500) thereof is input to x3.

<Prediction Rule Generation System>

Figure 5:
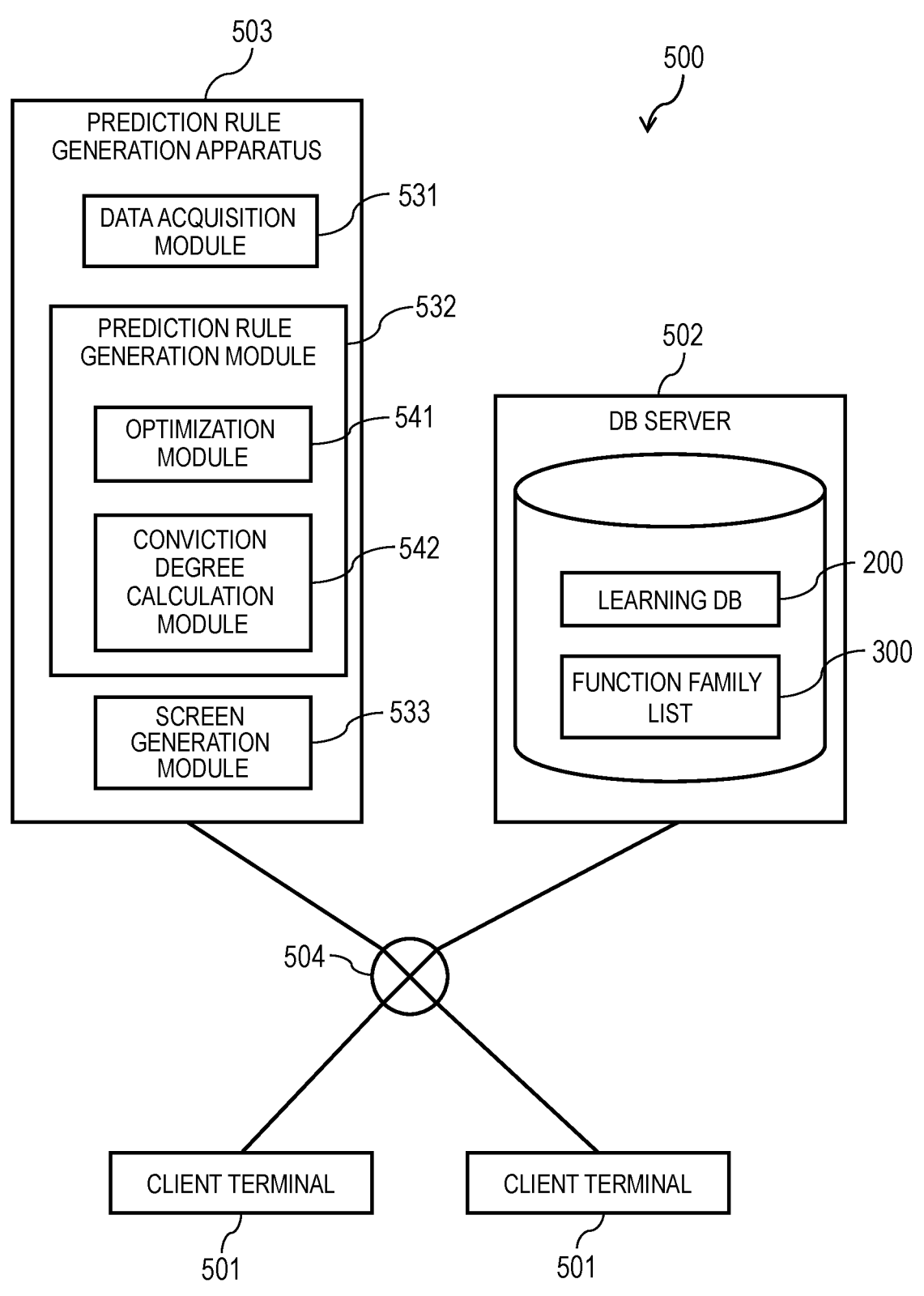
FIG. 5 is a block diagram for illustrating a system configuration example of a prediction rule generation system in the first embodiment.

FIG. 5 is a block diagram for illustrating a system configuration example of a prediction rule generation system in the first embodiment. The prediction rule generation system 500 includes one or more client terminals 501, a database (DB) server 502, and a prediction rule generation apparatus 503. The client terminals 501, the DB server 502, and the prediction rule generation apparatus 503 are coupled to each other for communication through a network 504 such as the Internet, a local area network (LAN), or a wide area network (WAN). The client terminals 501, the DB server 502, and the prediction rule generation apparatus 503 are each implemented by the computer 100 of FIG. 1.

The DB server 502 stores the learning DB 200 and the function family list 300. The learning DB 200 and the function family list 300 may be stored in the prediction rule generation apparatus 503.

The prediction rule generation apparatus 503 includes a data acquisition module 531, a prediction rule generation module 532, and a screen generation module 533. The prediction rule generation module 532 includes an optimization module 541 and a conviction degree calculation module 542. Specifically, the data acquisition module 531, the prediction rule generation module 532, and the screen generation module 533 are functions implemented by causing the processor 101 to execute programs stored in the storage device 102 of FIG. 1.

The data acquisition module 531 is a program caused to start by input from the client terminal 501. The data acquisition module 531 accesses the DB server 502 to acquire the learning DB 200 and the function family list 300 from the DB server 502, and stores the learning DB 200 and the function family list 300 in the storage device 102. Moreover, the data acquisition module 531 acquires information input from the client terminal 501 through a screen, converts the information to the search range limiting information 400, and stores the search range limiting information 400 in the storage device 102.

Figures 6, 7:
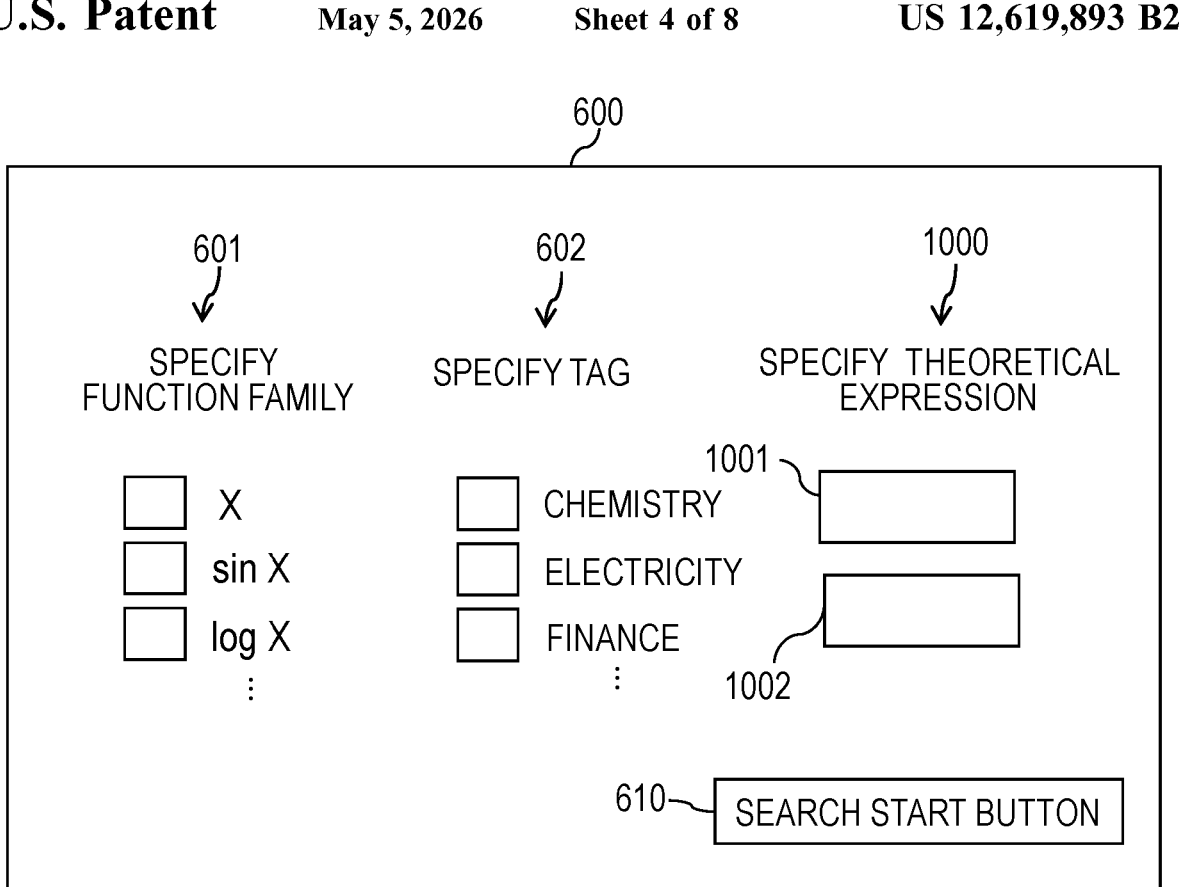
FIG. 6 is an explanatory diagram for illustrating an example of an input screen on the client terminal.
FIG. 7 is an explanatory diagram for illustrating an example of the candidate expression list.

FIG. 6 is an explanatory diagram for illustrating an example of an input screen on the client terminal 501. As illustrated in FIG. 6, the user can specify, from an input screen 600 of the client terminal 501, what prediction expression can convince the user through one or more methods of three methods. A first method is a method of specifying only the function family 301. On the input screen 600, a list of function families 601 included in the function family list 300 is displayed as illustrated in the left portion of FIG. 6, and the user can check one or more checkboxes to select function families 301 which can convince the user. In place of the check box, a form for inputting a real number value indicating how much the user can be convinced may be used.

A second method is a method of specifying only the tag 302. On the input screen 600, a tag list 602 included in the function family list 300 is displayed as illustrated in the center portion of FIG. 6, and the user can check one or more checkboxes to input tags 302 which can convince the user. In place of the check box, a form for inputting a real number value indicating how much the user can be convinced may be used. A third method is a method of specifying the function family 301 and the tag 302. In this method, when any one of the function family 301 and the tag 302 corresponds to a prediction expression, the conviction degree described later increases. Thus, compared with the first method and the second method, a frequency of the increase in conviction degree is increased, and hence optimization of the prediction expression can be accelerated. A fourth method is a method of inputting only a theoretical expression, and a fifth method is a method of inputting the theoretical expression and the tag 302. The fourth method and the fifth method are described in detail in the second embodiment.

In the first embodiment, it is assumed that the user does not input a theoretical expression, and uses any one of the above-mentioned two methods to specify a convincing prediction expression. When the user presses a search start button 610 after the user specifies a convincing prediction expression through one or more methods, the data acquisition module 531 starts.

Description is now given of an example of a method of converting the user input information to the search range limiting information 400. First, an initial value of the search range limiting information 400 is null. When the user checks the checkbox to specify a convincing function family 301, the data acquisition module 531 adds an entry of {type 401: "function family," element 402: function family 301 specified through the checkbox, conviction level 403: 1 (default)} to the search range limiting information 400.

For example, when the user checks the checkbox to specify only the function family 301 of "X" from the list of function families 601, an entry of {type 401: "function family," element 402: X, conviction level 403: 1 (default)} is added as in the entry on the first row of FIG. 4. When the checkbox is not used, and a real number value indicating how much the user can be convinced is input from the input screen 600, this real number value is set in that entry as the conviction level 403.

When the user checks the checkbox to specify from the tag list 602 only a tag 302 which convinces the user, the data acquisition module 531 adds an entry of {type 401: "tag," element 402: tag 302 specified through the checkbox, conviction level 403: 1 (default)} to the search range limiting information 400.

For example, when the user checks the checkbox to specify only the tag 302 of "chemistry," an entry of {type 401: "tag," element 402: chemistry, conviction level 403: 1 (default)} is added as in the entry on the second row of FIG. 4. When the checkbox is not used, and a real number value indicating how much the user can be convinced is input, this real number value is set in that entry as the conviction level 403.

The prediction rule generation module 532 generates a candidate expression list based on the learning DB 200, the function family list 300, and the search range limiting information 400. The candidate expression list includes one or more candidates of the prediction expression, and auxiliary information on each candidate.

FIG. 7 is an explanatory diagram for illustrating an example of the candidate expression list. A candidate expression list 700 includes a candidate number 701, a prediction expression 702, a precision 703, complexity 704, a conviction degree 705, and a tag 706. The precision 703, the complexity 704, the conviction degree 705, and the tag 706 are the auxiliary information on the prediction expression 702 specified by the candidate number 701.

The precision 703 is an index indicating a deviation between output of the prediction expression 702 and the objective function Y of the learning data. For example, a square error is used. In other words, as the square error becomes smaller, it is indicated that the precision 703 becomes higher. The complexity 704 is an index for indicating complexity of the prediction expression 702. For example, the number of parameters of the prediction expression 702 is used as the complexity 704. For example, a prediction expression 702 in an entry on the second row has four parameters of "255," "0.00043," "0.3," and "28," and hence the complexity 704 is "4."

Moreover, the conviction degree 705 is a score relating to the prediction expression 702. Specifically, for example, the conviction degree 705 is an index value for evaluating how much the user can be convinced by the prediction expression 702, and is calculated based on the search range limiting information 400. When a conviction degree 705 of a certain prediction expression 702 is higher than a conviction degree 705 of another prediction expression 702, it is indicated that the user is convinced by this certain prediction expression 702 more than the another prediction expression 702. The tag 706 is the tag 302 determined from the function family list 300. A specific determination method for the candidates of the prediction expression 702 and a specific calculation method for the auxiliary information are described later. The number of candidates of the prediction expression 702 to be output is two in FIG. 7. However, the number of candidates may be determined as a constant in advance in the prediction rule generation apparatus 503, or may be set by the user in the prediction rule generation apparatus 503 through the client terminal 501.

The optimization module 541 uses the learning DB 200 to calculate a plurality of candidates of the prediction expression 702 which reflect the precision 703 and the conviction degree 705, and maximize an objective function L, and outputs the candidate expression list 700.

The conviction degree calculation module 542 calculates the conviction degree 705 based on the prediction expression 702 under search. The prediction expression 702 under search is input from the optimization module 541. Moreover, the calculated conviction degree 705 is used in the optimization by the optimization module 541. Description is now given of an example of a calculation method for the conviction degree 705.

First, the conviction degree calculation module 542 sets an initial value of the conviction degree 705 to 0. After that, the conviction degree calculation module 542 performs the following processing for each row R of the search range limiting information 400. When the type 401 of the row R is the function family 301, and the prediction expression 702 under search and the element 402 of the row R of the search range limiting information 400 are the same function family 301, the value of the conviction level 403 on the row R of the search range limiting information 400 is added to the current conviction degree 705.

For example, when the prediction expression 702 under search is y=x1, this prediction expression 702 corresponds to Y=X being the element 402 on the first row of the search range limiting information 400 of FIG. 4. Thus, the conviction degree calculation module 542 adds the value "1" of the conviction level 403 to the conviction degree 705.

Moreover, when the type 401 on the row R is the tag 302, the conviction degree calculation module 542 determines whether or not the element 402 on the row R is included in the tag 706 corresponding to the prediction expression 702 under search. When the element 402 is included in the tag 706, the conviction degree calculation module 542 adds the value of the conviction level 403 on the row R to the current conviction degree 705.

At this time, the conviction degree calculation module 542 identifies the tag 706 corresponding to the prediction expression 702 under search from the function family list 300. For example, consideration is given to a situation in which the prediction expression 702 under search is y=x1, and an entry on a second row R of the search range limiting information 400 of FIG. 4 is to be processed. In this case, the tag 302 of "chemistry" being the element 402 on the second row R corresponds to the tag 302 corresponding to "X" of the function family 301 in the function family list 300.

Thus, the conviction degree calculation module 542 adds a value "1" of the conviction level 403 of the element 402 (chemistry) on the second row R to the conviction degree 705 of the prediction expression 702 under search. After that, the conviction degree calculation module 542 sets "chemistry" being the tag 302 corresponding to "X" of the function family 301 to the tag 706 of the prediction expression 702 under search. Processing performed in a case in which the type 401 on the row R is the theoretical expression is described in the second embodiment.

The screen generation module 533 converts the candidate expression list 700 to a form which can be displayed on a screen on the client terminal 501.

FIG. 8 is an explanatory diagram for illustrating an example of the display screen on the client terminal 501. A display screen 800 displays a candidate expression list 700, a candidate number input form 801, a search finish button 802, a precision improvement button 803, and an improvement result 804.

The candidate number input form 801 is a field for receiving input of the candidate number 701. The search finish button 802 is a user interface for finishing the search for the prediction expression 702 corresponding to the candidate number 701 input to the candidate number input form 801. The precision improvement button 803 is a user interface for reflecting correction to the entry corresponding to the candidate number 701 input to the candidate number input form 801. The improvement result 804 is a candidate expression list 700 after the correction to be displayed by pressing the precision improvement button 803.

For example, when a prediction expression 702 having a satisfactory precision 703 and a satisfactory conviction degree 705 exists in the candidate expression list 700, the user inputs the candidate number 701 thereof into the candidate number input form 801, and presses the search finish button 802.

Moreover, when a prediction expression 702 which is convincing but has an insufficient precision 703 exists in the candidate list 700, the user inputs the candidate number 701 thereof, and presses the precision improvement button 803. A processing method for the precision improvement is described later. As a result, each process of the prediction rule generation apparatus 503 is executed again, and results thereof are displayed as a new candidate list 700 on the screen on the client terminal 501.

<Optimization Processing Procedure>

Figure 9:
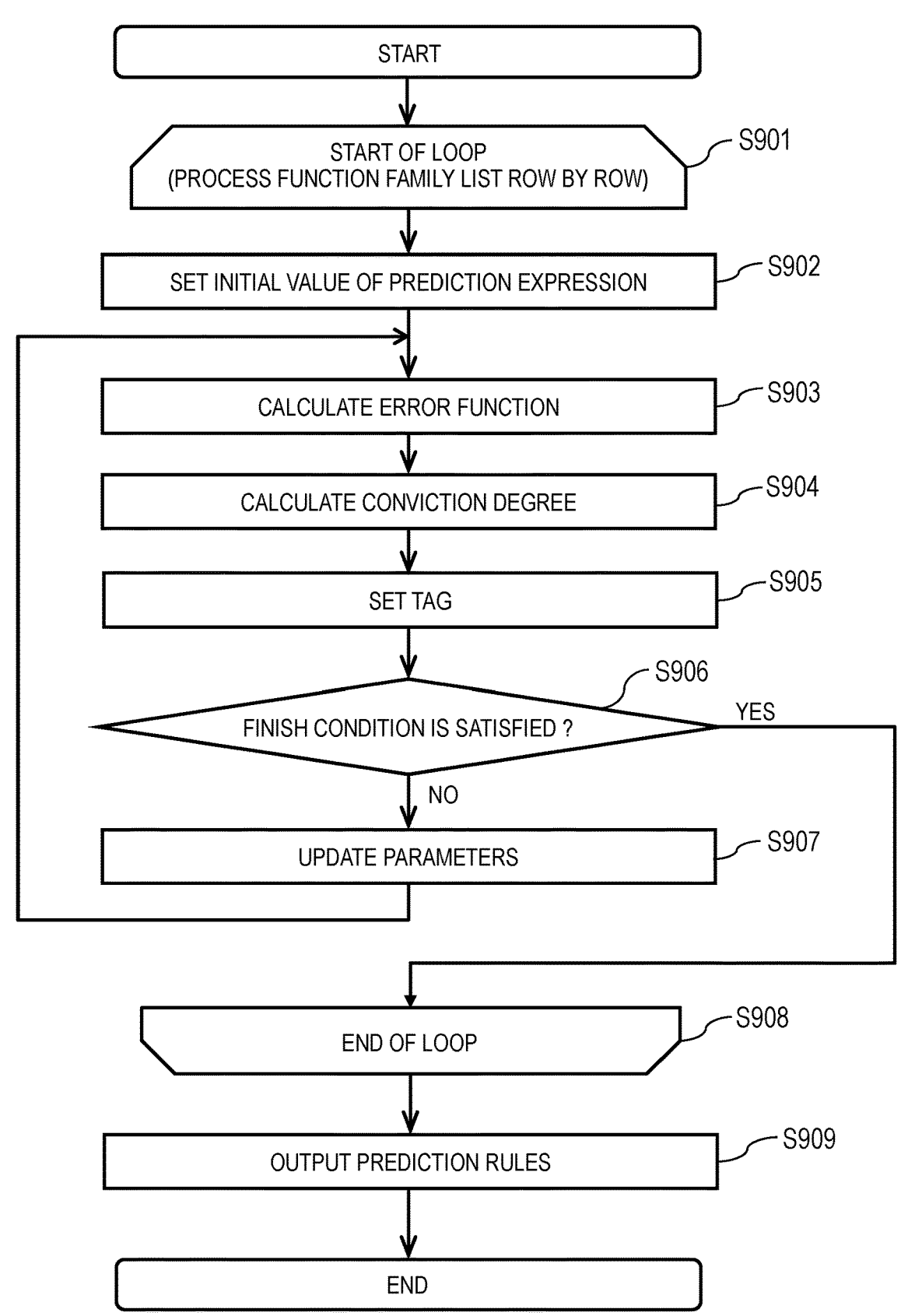
FIG. 9 is a flowchart for illustrating an example of an optimization processing procedure performed by the optimization module and the conviction degree calculation module.

FIG. 9 is a flowchart for illustrating an example of an optimization processing procedure performed by the optimization module 541 and the conviction degree calculation module 542. Only Step S904 and Step S905 are processing steps to be executed by the conviction degree calculation module 542, and details thereof are described above. Steps other than Step S904 and Step S905 are processing steps to be executed by the optimization module 541, and are described in detail below.

The optimization module 541 selects an unselected entry from the function family list 300 (Step S901). The optimization module 541 sets an initial value of the prediction expression 702 for the entry selected from the function family list 300 (Step S902). The optimization module 541 calculates an error function for the entry selected from the function family list 300, to thereby set the precision 703 (Step S903).

The conviction degree calculation module 542 calculates the conviction degree 705 for the entry selected from the function family list 300 as described above (Step S904). The conviction degree calculation module 542 sets the tag 706 for the entry selected from the function family list 300 as described above (Step S905).

The optimization module 541 determines whether or not a finish condition is satisfied (Step S906). When the finish condition is not satisfied ("No" in Step S906), the optimization module 541 updates the prediction expression under search (Step S907), and the process returns to Step S903. Meanwhile, when the finish condition is satisfied ("Yes" in Step S906), the optimization module 541 determines whether or not an unselected entry exists in the function family list 300 (Step S908).

When an unselected entry exists, the process returns to Step S901. When an unselected entry does not exist, the optimization module 541 outputs an optimization result to the client terminal 501 (Step S909). As a result, the series of processing steps is finished. A detailed description is now given of each step.

A purpose of Step S901 to Step S907 is to calculate a function optimal in terms of the precision 703 and the conviction degree 705 out of the functions belonging to the function family 301 of the selected entry. In this case, a function belonging to the function family 301 of the selected entry is a function that can be represented in a form of $wF(a1x1+a2x2+ \ldots +anxn+b)$ obtained by inputting a first-order function of the explanatory variables X into X of the function F(X) representing the function family 301 of the selected entry and multiplying the obtained function by a constant number.

For example, when the function family 301 of the selected entry is "sin X," and the explanatory variables X are three variables of x1, x2, and x3, the optimization module 541 searches for an optimal function out of functions having a form of $w \sin(a1x1+a2x2+a3x3+b)$.

In this case, $p=(w, a1, a2, \ldots, an, b)$ are real numbers, and are variables for the optimization. When the parameters p are determined, $wF(a1x1+a2x2+ \ldots +anxn+b)$ of the prediction expression 702 is determined, and hence the parameters p are hereinafter sometimes referred to as "prediction expression 702." Each function family 301 of the function family list 300 is differentiable, and hence can be optimized through, for example, a gradient method.

Specifically, the optimization module 541 first defines initial values of the parameters p in Step S902. For example, the optimization module 541 sets initial values p0 of the parameters p to $p0=(w, a1, a2, \ldots, an, b)=(1, 1, 1, \ldots, 1, 0)$.

In Step S903, the optimization module 541 calculates an error function for the preliminary search parameters p0. As the error function, for example, a square error $\Sigma|y(i)-f(x(i))|^2$ is used.

In this case, the sum $\Sigma$ is obtained for an entry i of the learning DB 200. Here, y(i) corresponds to the objective variable Y, and is the strength 204 in the first embodiment. Moreover, f(x(i)) is a prediction value calculated based on the explanatory variables x(i) of the entry on an i-th row. In other words, f(x(i)) is an output value at the time when the explanatory variables x(i) of the entry on the i-th row are input into $wF(a1x1+a2x2+ \ldots +anxn+b)$ of the prediction expression 702 corresponding to the parameters p0.

In Step S904, as described above, the conviction degree calculation module 542 updates the conviction degree 705. In Step S905, as described above, the conviction degree calculation module 542 sets the tag 302 corresponding to the function family 301 to the tag 706 of the prediction expression 702 under search.

In Step S906, for example, the optimization module 541 calculates the value of the objective function L for the parameters p0 being the preliminary prediction expression 702. When the value of the objective function L deteriorates with respect to a preliminary optimal value, that is, increases from the preliminary optimal value, the optimization module 541 determines that the finish condition is satisfied ("Yes" in Step S906). In this case, the objective function L is, for example, a weighted sum "$L=L1-C \times L2$" of a value of the error function L1 calculated in Step S903 and $-L2$ obtained by multiplying a value L2 of the conviction degree 705 calculated in Step S904 by $-1$.

An initial value of the preliminary optimal value is a value set in advance (or a value of the objective function L at the time when the determination of "No" is made in Step S906 performed for the first time), and is updated with the value of the objective function L at the time when the determination of "No" is made in Step S906.

It is considered that as the value of the objective function L becomes smaller, the prediction expression 702 becomes better. Specifically, for example, as L1 becomes smaller, and L2 becomes larger, the value of the objective function L decreases. In this case, C is a positive constant, and is a parameter for controlling which of the precision 703 and the conviction degree 705 is to be emphasized. The constant C may be determined as a constant in advance in the prediction rule generation apparatus 503, or may be specified by the user in the prediction rule generation apparatus 503 through the client terminal 501.

In Step S906, when the finish condition is satisfied ("Yes" in Step S906), the optimization module 541 stores, in the storage device 102, the optimal prediction expression 702 optimal when the finish condition is satisfied, the precision 703 being the error function calculated in Step S903, and the conviction degree 705 calculated in Step S904, and the process proceeds to Step S908.

Meanwhile, when the finish condition is not satisfied ("No" in Step S906), that is, the value of the objective function L is not deteriorated compared with the preliminary optimal value, the optimization module 541 uses the parameters p0 to update the latest optimal value and the prediction expression 702 which achieves this optimal value (Step S907), and the process returns to Step S903.

In Step S907, the optimization module 541 updates the parameters of the prediction expression 702 under search. For example, the optimization module 541 calculates a gradient vector YL for the objective function L for the parameters $p0=(w, a1, a2, \ldots, an, b)$ being the prediction expression 702 at the current time, and sets $p0-VL$ as p0 of a new prediction expression 702. After that, the process returns to Step S903 and the prediction module 541 repeats the processing for p0 of the new prediction expression 702. The above-mentioned loop is executed until the finish condition is satisfied ("Yes" in Step S906).

However, when the finish condition is not satisfied even after the search has been executed N times ("No" in Step S906), the optimization module 541 may terminate the search based on the prediction expression 702 at that time. In this case, N is a parameter for specifying the maximum value of the number of times of search. The parameter N may be determined as a constant in advance in the prediction rule generation apparatus 503, or may be specified by the user in the prediction rule generation apparatus 503 through the client terminal 501.

In Step S909, the optimization module 541 outputs the prediction rules. Specifically, for example, the optimization module 541 sorts the optimal prediction expressions 702 each of which has been determined in each function family 301, and outputs M optimal prediction expressions 702. As the order of the sort, specifically, for example, an ascending order of the error function L1, a descending order of the conviction degree L2, or an ascending order of the objective function L are given. In this case, M is a parameter for specifying the number of prediction expressions 702 to be output. The parameter M may be determined as a constant in advance in the prediction rule generation apparatus 503, or may be specified by the user in the prediction rule generation apparatus 503 through the client terminal 501.

Description is now given of processing performed in a case in which the user presses the precision improvement button 803 of FIG. 8. The optimization module 541 executes again the optimization based on p0 being the prediction expression 702 corresponding to the candidate number 701 input to the candidate number input form 801.

Specifically, the optimization module 541 uses the prediction rule generation module 532 to obtain "p0+p1" as the optimal prediction expression 702 based on p0 in the same manner as in the first time. In other words, the optimization module 541 fixes p0, and then searches for p1 which correctly predicts a residual y−p0 of that prediction expression 702.

The processing performed by the prediction rule generation module 532 is basically completely the same as the processing performed in the case in which p0 is searched for, and p1 is searched for. However, a conviction degree 705 for p1 is used as the conviction degree 705. In other words, for example, the optimization module 541 sets the error function L1 as $L1=\Sigma|y(i)-(p0+p1)(x(i))|^2$, sets the conviction degree 705 of p1 as L2, and searches for p1 which minimizes "L=L1−C×L2." When the plurality of candidates of p1 are retrieved, the optimization module 541 causes the client terminal 501 to again display the display screen 800 of FIG. 8 through the screen generation module 533 in the same manner as for the first time.

In FIG. 8, p0 is displayed as the prediction expression 702, and "p0+p1" is displayed as the prediction expression 702 after the update. For example, in FIG. 8, "2" is input to the candidate number input form 801 as the candidate number 701. When the precision improvement button 803 is pressed, "p0=255 sin(0.00043x_2+0.3x_3+28)" being a prediction expression 702 having "2" as the candidate number 701 is optimized, and the improvement result 804 is displayed. In the improvement result 804, two prediction expressions 702 are displayed.

In the improvement result 804, the prediction expression 702 having "1" as the candidate number 701 is "255 sin(0.00043x_2+0.3x_3+28)+cos(x_1)." Here, "255 sin(0.00043x_2+0.3x_3+28)" is p0, and "cos(x_1)" is p1.

Similarly, in the improvement result 804, the prediction expression 702 having "2" as the candidate number 701 is "255 sin(0.00043x_2+0.3x_3+28)+exp(x_2+x_3)." Here, "255 sin(0.00043x_2+0.3x_3+28)" is p0, and "exp(x_2+x_3)" is p1.

After that, this operation is repeated until the user presses the search finish button 802. For example, when the precision improvement button 803 is pressed again, p2 for correctly predicting "y-p0-p1" is searched for.

Second Embodiment

The second embodiment is now described. In the second embodiment, description is given of an example in which the prediction rule is calculated based on the learning DB 200, the search range limiting information 400, and the function family list 300. The second embodiment is different from the first embodiment in such a point that the conviction degree calculation module 542 outputs, as the conviction degree 705, similarity indicating how much the prediction expression 702 and the specified theoretical expression are similar to each other. In other words, in the second embodiment, the conviction degree 705 becomes higher as the prediction expression 702 becomes more similar to the theoretical expression specified by the user, and the prediction rule generation apparatus 503 searches for an expression having a higher conviction degree 705 and a higher precision 703.

In the second embodiment, the search range limiting information 400 includes entries each having the theoretical expression as the type 401. In other words, the user inputs a theoretical expression through the input screen 600 illustrated in FIG. 10, and the data acquisition module 311 converts the theoretical expression to search range limiting information including an entry having the theoretical expression as the type 401. In the second embodiment, differences from the first embodiment are mainly described, and hence description of portions common to the first embodiment is omitted.

Figure 10:
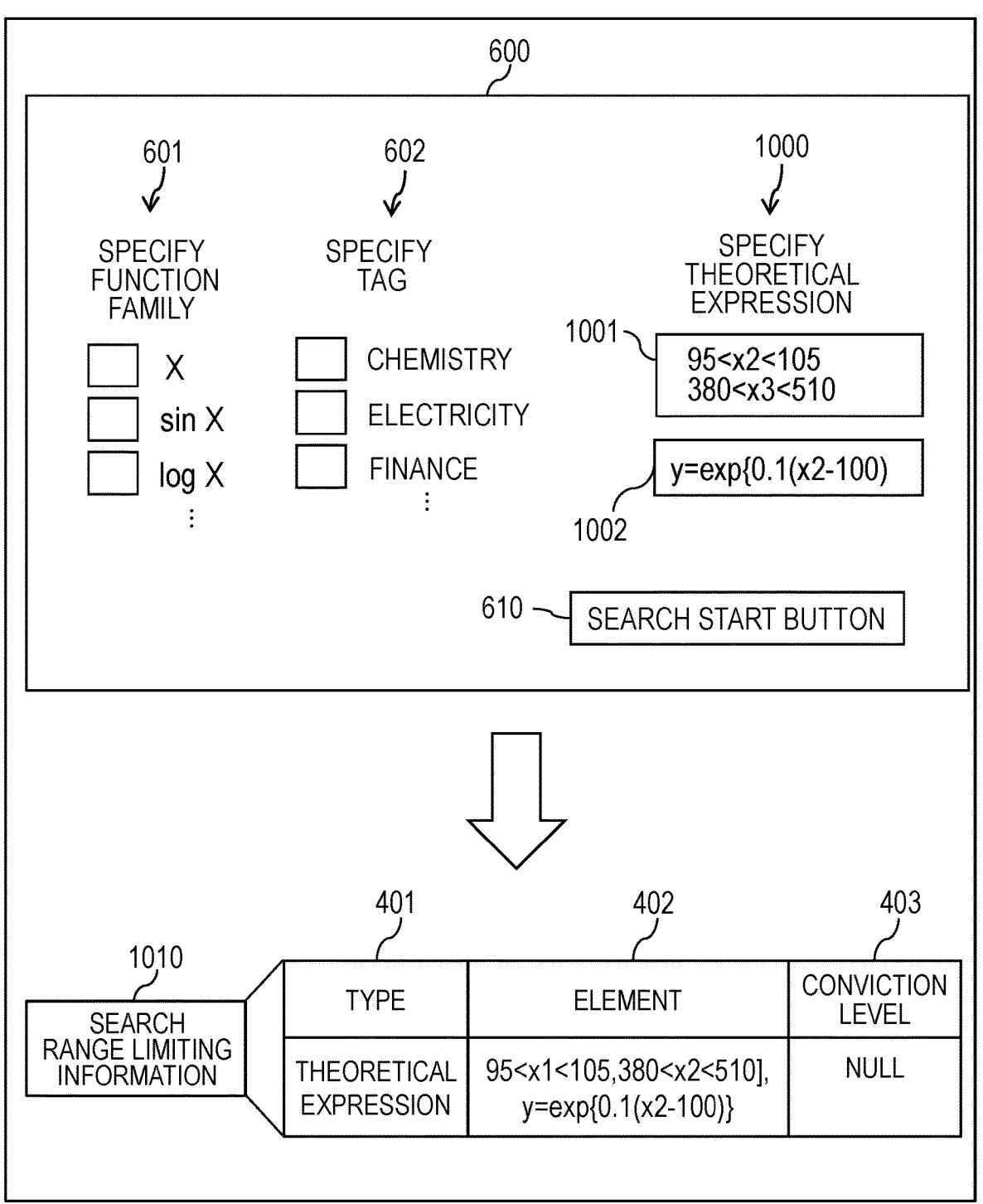
FIG. 10 is an explanatory diagram for illustrating a generation example of the search range limiting information.

FIG. 10 is an explanatory diagram for illustrating a generation example of the search range limiting information. The input screen 600 includes a theoretical expression specifying area 1000. The theoretical expression specifying area 1000 includes a condition input form 1001 and a theoretical expression input form 1002. The condition input form 1001 is an input field for receiving input of a condition for the explanatory variable X. The theoretical expression input form 1002 is an input field for receiving input of a theoretical expression. The theoretical expression specifying area 1000 may be of such a type that input of character strings is directly received or such a type that buttons for operators such as +, −, ×, /, sin, exp, >, and < and buttons for the respective explanatory variables x1, x2, . . . are provided, and those buttons are used for the input as in a scientific electronic calculator.

The theoretical expression is a prediction expression 702 for the objective variable Y predicted to hold under a specific condition. Specifically, the theoretical expression is specified by a combination of the specific conditions input to the condition input form 1001 and the prediction expression 702 which predicts the objective variable Y input to the theoretical expression input form 1002 through the explanatory variables X.

For example, it is assumed that "95<x2<105" and "380<x3<519" are input as a condition D for x2 and x3 being the explanatory variables X to the condition input form 1001, and "y=exp{0.1(x2−100)}" is input as a theoretical expression q to the theoretical expression input form 1002.

The data acquisition module 531 converts the information input to the theoretical expression specifying area 1000 to search range limiting information 1010. The search range limiting information 1010 has, for example, a character string of "theoretical expression" in the type 401, the combination of the condition D input to the condition input form 1001 and the theoretical expression q input to the theoretical expression input form 1002 in the element 402, and blank, that is, NULL, in the conviction level 403.

Figure 11:
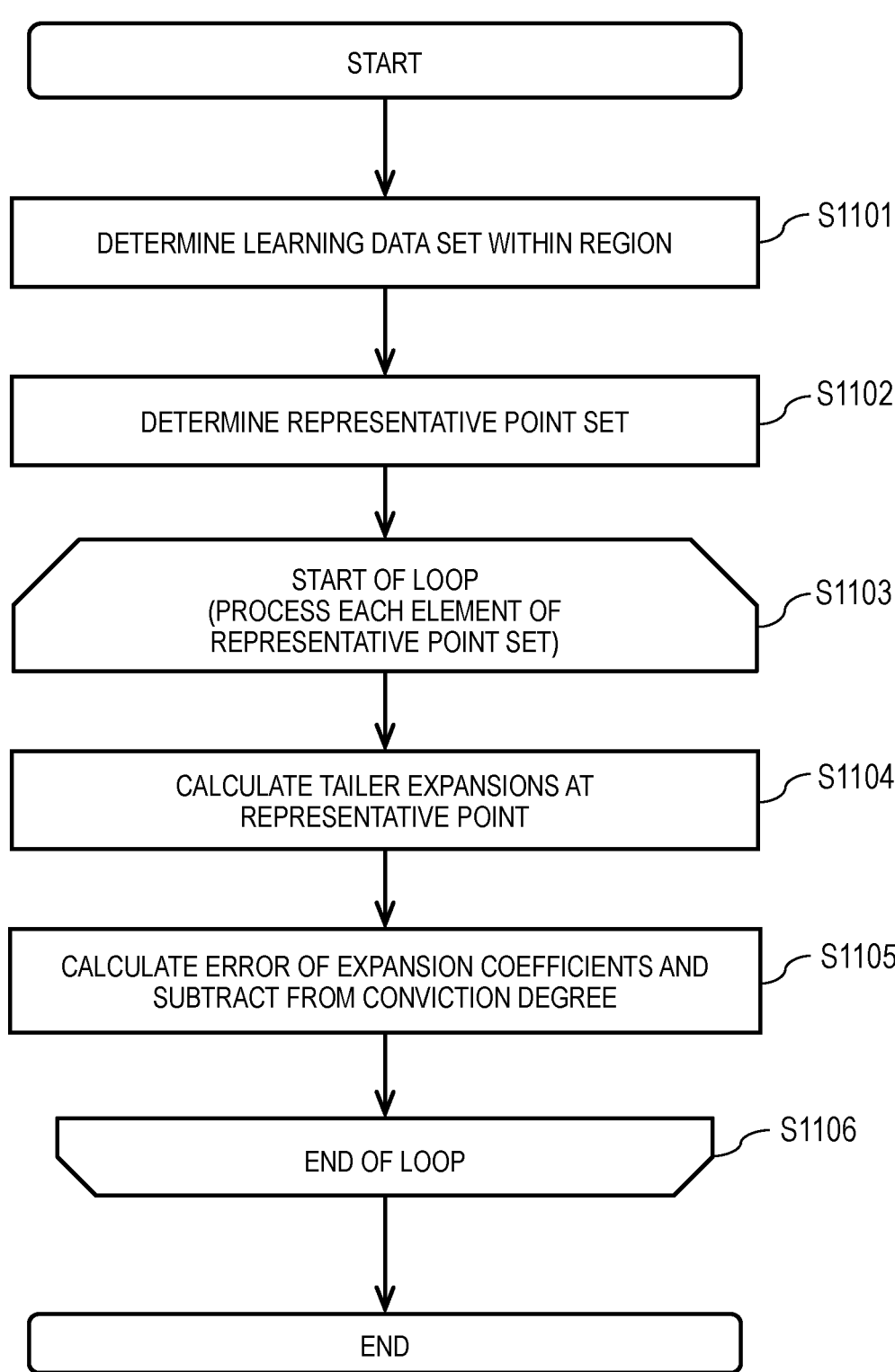
FIG. 11 is a flowchart for illustrating an example of the conviction degree calculation processing procedure (Step S904) for the search range limiting information.

FIG. 11 is a flowchart for illustrating an example of the conviction degree calculation processing procedure (Step S904) for the search range limiting information 1010. In FIG. 11, there is illustrated processing in which the conviction degree calculation module 542 calculates similarity indicating how much "p" being the prediction expression 702 currently searched for is similar to the theoretical expression q under the condition D, and outputs this similarity as the conviction level 403 of "p."

The conviction degree calculation module 542 acquires, from the learning DB 200, learning data which satisfies the condition D (Step S1101). Specifically, for example, the conviction degree calculation module 542 determines whether or not each entry of the learning DB 200 satisfies inequalities of the condition D. The conviction degree calculation module 542 acquires only entries satisfying the condition D, and sets those entries as an acquired entry group A. For example, entries which satisfy the condition D in FIG. 2 are the entry 211 on the first row and the entry 216 on the sixth row. Thus, the conviction degree calculation module 542 acquires those two entries 211 and 216 as the acquired entry group A.

Next, the conviction degree calculation module 542 determines one or more representative points for calculating the similarity (Step S1102). For example, the conviction degree calculation module 542 may set, as the representative point, each of the entries of the acquisition entry group A, or may set, as the representative point, average data of the acquired entry group A, that is, values obtained by averaging values of each of the explanatory variables X. For example, when each entry is set as the representative point, each of the entry 211 on the first row and the entry 216 on the sixth row is directly set as the representative point. When values of each of the explanatory variables X are averaged, an entry having the average values is the one representative point.

Next, the conviction degree calculation module 542 selects an unselected representative point from the set of the representative points (Step S1103). The conviction degree calculation module 542 executes processing steps of Step S1104 and Step S1105 for a selected representative point Xi, and the process proceeds to Step S1106. In Step S1106, the conviction degree calculation module 542 determines whether or not an unselected representative point exists in the set of the representative points. When an unselected representative point exists, the process returns to Step S1103. Meanwhile, when an unselected representative point does not exist, the series of processing steps is finished.

In Step S1104, the conviction degree calculation module 542 calculates how much "p" being the prediction expression 702 and the theoretical expression q are similar to each other in a vicinity of the selected representative point Xi. Specifically, for example, the conviction degree calculation module 542 obtains Taylor expansions up to K-th order of the prediction expression p and the theoretical expression q at the selected representative point Xi. A list obtained by arranging coefficients of the prediction expression p is set as $\{p1, p2, \ldots, pt\}$. A list obtained by arranging coefficients of the theoretical expression q is set as $\{q1, q2, \ldots, qt\}$. It is required that each element 402 of the function family list 300 can be differentiated K times or more.

In this case, K is an integer of 0 or more. The value K may be determined as a constant in advance in the prediction rule generation apparatus 503, or may be specified by the user in the prediction rule generation apparatus 503 through the client terminal 501.

In Step S1105, the conviction degree calculation module 542 calculates similarity between the coefficients $\{p1, p2, \ldots, pt\}$ and the coefficients $\{q1, q2, \ldots, qt\}$ obtained through the Taylor expansions in Step S1104. For example, the conviction degree calculation module 542 calculates a value obtained by multiplying a square error $\Sigma(p_j-q_j)^2$ by $-1$. The summation $\Sigma$ is taken from $j=1$ to $j=t$. As this square error becomes larger, "p" being the prediction expression 702 becomes separated more from the theoretical expression q, and hence the value obtained by multiplying the square error by $-1$ can be considered as the similarity. The conviction degree calculation module 542 subtracts this similarity from the value L2 of the conviction degree 705. The processing performed by the conviction degree calculation module 542 has been described above. Moreover, the prediction rule generation apparatus 503 may output the coefficients $\{p1, p2, \ldots, pt\}$ and the coefficients $\{q1, q2, \ldots, qt\}$.

Processing for executing again the optimization in order to improve the precision 703 is also the same as that in the first embodiment. In other words, when the user presses the precision improvement button 803 displayed on the display screen 800 of FIG. 8, and the optimization is thus executed again, the optimization module 541 obtains p1 which minimizes "L1−C×L2" based on the error function L1 and the conviction degree L2, and outputs the new expression "p0+ p1" as described in the first embodiment. In this case, similarity between the theoretical expression q and "p0+p1" being the prediction expression 702 is used as the conviction degree 705. The calculation of the similarity is the same as the above-mentioned optimization method performed for the first time.

As described above, according to the first embodiment and the second embodiment, the prediction rule generation apparatus 503 prepares, in advance, the simple function family list 300 as the set of the candidates of the prediction rules, and searches the candidates for the prediction rules which are highly precise and are likely to convince experts. At the time of the search, the prediction rule generation apparatus 503 uses the search range limiting information 400 which describes which prediction rules can convince the experts. Specifically, the prediction rule generation apparatus 503 generates the prediction rules which optimize the precision 703 and the conviction degree 705 while calculating the conviction degree 705 for each prediction rule based on the search range limiting information 400.

As described above, it is possible to present, to the user, the index indicating whether or not the generated prediction rule is a convincing result from the view point of the user through the calculation of the conviction degree 705. Moreover, the generated prediction rule is expressed as the polynomial, and hence is not a learning model such as a black box having unknown contents as in the artificial intelligence (AI). Thus, the generated prediction rule can be presented to the user as highly precise and simple information. Moreover, it is possible to increase ease of understanding of the prediction rule by adding also the auxiliary information, such as the complexity 703 and the tag 706. As a result, it is possible to obtain a prediction rule which is highly precise and simple, and can convince the user.

The prediction rule generation apparatus 503 is useful in, for example, the following cases. For example, in a case in which only an expression simple for a customer can convince the customer for persuasion of the customer, quality assurance, and the like, it is possible to prompt the customer to select, from the input screen 600, a function which the customer can understand out of the function families 301, and to present a prediction rule within the search range limiting information 400. For example, in a case of a phenomenon relating to an electromagnetic wave, it is only required to prompt a user who knows a sine function and a Bessel function and can thus be convinced to select the sine function or the Bessel function out of the function families 301. With this configuration, the user can directly select a function family 301 which can convince the user, or the user can specify a domain, to thereby indirectly select a function family 301 to be searched for.

Moreover, for a user who partially knows an expression E and is thus convinced in a case in which a prediction rule is consistent with the expression E, the prediction rule generation apparatus 503 presents the prediction rule when a coefficient of a K-th order of a Tayler expansion at a representative point in a local region is similar to a coefficient of the expression E as described in the second embodiment. For example, when the user thinks that an expression E: $y=x1+2x1+x2^2$ should hold under a condition of x3.4, the prediction rule generation apparatus 503 can indirectly limit a function under search through input of the expression E and the condition therefor by the user.

It should be noted that this disclosure is not limited to the above-mentioned embodiments, and encompasses various modification examples and the equivalent configurations within the scope of the appended claims without departing from the gist of this disclosure. For example, the above-mentioned embodiments are described in detail for a better understanding of this disclosure, and this disclosure is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A generation apparatus, comprising:
a processor configured to execute a program; and
a storage device configured to store the program,
the generation apparatus being configured to access:
    a set of pieces of learning data each being a combination of a value of an explanatory variable and a value of an objective variable;
    a function family list including, of functions each indicating a physical law and an attribute of each of the functions, at least the functions; and
    search range limiting information for limiting a search range of the function family list,
wherein the generation apparatus is configured to generate interpretable prediction expressions by constraining a search space to physically meaningful functions from the function family list that indicate physical laws, wherein the function family list is pre-configured based on domain-specific knowledge of physical laws applicable to a target prediction domain, to thereby address a technical problem of black-box machine learning models by producing prediction rules that are both accurate and explainable,
wherein the processor is configured to execute:
    first generation processing of generating a first prediction expression that is interpretable by setting a first parameter for the explanatory variable to a first function included in the function family list, wherein the first function indicates a physical law, and wherein generating the first prediction expression comprises constraining the search space to the physically meaningful functions from the function family list;
    first calculation processing of calculating, based on the search range limiting information, a first conviction degree relating to the first prediction expression generated through the first generation processing, wherein the first conviction degree is calculated as a measure of consistency between the first prediction expression and domain-specific knowledge represented by the search range limiting information, wherein calculating the first conviction degree comprises evaluating conformity of the first prediction expression to physical law constraints specified in the search range limiting information, and wherein the first conviction degree is calculated independently of prediction accuracy of the first prediction expression, wherein the domain-specific knowledge comprises at least one of physical laws and theoretical expressions specified in the search range limiting information; and
    first output processing of outputting the first prediction expression and the first conviction degree calculated through the first calculation processing only when the first prediction expression satisfies both (i) a precision requirement based on prediction accuracy measured against the objective variable and (ii) a conviction degree threshold indicating that the first prediction expression conforms to the physical law constraints within a predetermined tolerance, wherein the precision requirement and the conviction degree threshold are independently evaluated.

2. The generation apparatus according to claim 1,
wherein the search range limiting information is a specific function included in the function family list, and
wherein, in the first calculation processing, the processor is configured to calculate the first conviction degree based on the specific function and the first function of the first prediction expression.

3. The generation apparatus according to claim 1,
wherein the function family list includes the attribute of each of the functions,
wherein the search range limiting information is a specific attribute included in the function family list, and
wherein, in the first calculation processing, the processor is configured to calculate the first conviction degree based on the specific attribute and an attribute of the first function of the first prediction expression.

4. The generation apparatus according to claim 3, wherein, in the first output processing, the processor is configured to output the specific attribute.

5. The generation apparatus according to claim 1,
wherein the search range limiting information includes a range of the value of the explanatory variable and a theoretical expression which holds within the range, and
wherein, in the first calculation processing, the processor is configured to acquire specific learning data corresponding to the range of the value of the explanatory variable from the set of pieces of learning data, and to calculate, as the first conviction degree, similarity between the first prediction expression and the theoretical expression through use of the specific learning data.

6. The generation apparatus according to claim 5, wherein, in the first calculation processing, the processor is configured to obtain Taylor expansions of the first prediction expression and the theoretical expression to each of which the specific learning data is input, and to calculate, as the first conviction degree, similarity between a coefficient obtained from the Taylor expansion of the first prediction expression and a coefficient obtained from the Tayler expansion of the theoretical expression.

7. The generation apparatus according to claim 6, wherein, in the first output processing, the processor is configured to output the coefficient obtained from the Taylor expansion of the first prediction expression and the coefficient obtained from the Taylor expansion of the theoretical expression.

8. The generation apparatus according to claim 1, wherein the processor is configured to execute first optimization processing of calculating an objective function of the first prediction expression based on a precision of the first prediction expression obtained from a prediction value calculated by inputting the value of the explanatory variable to the first prediction expression and the value of the objective variable and on the first conviction degree, wherein the objective function combines the precision and the first conviction degree as separate weighted terms to balance prediction accuracy against conformity to physical law constraints, and updating the first parameters based on the objective function, wherein updating the first parameters comprises adjusting the first parameters to improve both the precision and the first conviction degree as reflected in the objective function, wherein, in the first generation processing, the processor is configured to set, in the first function, the first parameters that have been updated through the first optimization processing, to thereby update the first prediction expression, wherein, in the first calculation processing, the processor is configured to calculate a first conviction degree relating to the updated first prediction expression generated through the first generation processing based on the search range limiting information, and wherein, in the first output processing, the processor is configured to output the updated first prediction expression and the first conviction degree relating to the updated first prediction expression.

9. The generation apparatus according to claim 8, wherein the processor is configured to repeatedly execute the first generation processing and the first calculation processing until the objective function satisfies a predetermined condition.

10. The generation apparatus according to claim 8, wherein, in the first output processing, the processor is configured to output the updated first prediction expression and the first conviction degree relating to the updated first prediction expression when the objective function satisfies a predetermined condition.

11. The generation apparatus according to claim 1, wherein, in the first output processing, the processor is configured to output complexity of the first prediction expression.

12. The generation apparatus according to claim 11, wherein the complexity of the first prediction expression is a number of first parameters.

13. The generation apparatus according to claim 1, wherein the processor is configured to execute:

second generation processing of generating a second prediction expression by setting a second parameter for the explanatory variable to a second function included in the function family list;

second calculation processing of calculating, based on the search range limiting information, a second conviction degree relating to the second prediction expression generated through the second generation processing; and second output processing of outputting a polynomial including the first prediction expression and the second prediction expression and the second conviction degree calculated through the second calculation processing.

14. The generation apparatus according to claim 1, wherein the processor is further configured to:

control a physical manufacturing process based on the first prediction expression by adjusting at least one manufacturing parameter corresponding to the explanatory variable to achieve a target value of the objective variable, wherein the manufacturing parameter comprises at least one of water content, cement content, or manufacturing date in a concrete manufacturing process, and wherein the target value of the objective variable comprises a target strength value for manufactured concrete.

15. The generation apparatus according to claim 1, wherein:

the function family list is specific to a concrete manufacturing domain and includes functions representing physical relationships between manufacturing conditions and concrete strength;

the search range limiting information specifies physical law constraints applicable to concrete manufacturing; and the processor is configured to generate the first prediction expression to predict concrete strength based on manufacturing conditions including water content and cement content, wherein the first prediction expression is constrained to conform to known physical laws governing concrete strength development.

16. The generation apparatus according to claim 1, wherein the processor is further configured to:

validate the first prediction expression by comparing predicted values generated by the first prediction expression against actual measured values of the objective variable from a validation dataset distinct from the set of pieces of learning data;

calculate a validation error metric quantifying deviation between the predicted values and the actual measured values; and output the first prediction expression only when the validation error metric satisfies a validation threshold, wherein the validation threshold is determined based on requirements for reliable prediction in a target application domain.

17. The generation apparatus according to claim 1, wherein:

the function family list includes a plurality of distinct function families each representing a different physical law, wherein each function family comprises a differentiable mathematical function;

the search range limiting information specifies at least one of: (i) a subset of the plurality of distinct function families to be searched, or (ii) a specific attribute tag associated with one or more of the plurality of distinct function families; and the processor is configured to, in the first generation processing, select the first function from the subset of the plurality of distinct function families specified by the search range limiting information, wherein the selection is based on maximizing the first conviction degree while maintaining the precision requirement.

18. The generation apparatus according to claim 5, wherein:

the theoretical expression is a domain-specific physical law equation that relates the explanatory variable to the objective variable under specified conditions; and the processor is configured to, in the first calculation processing:

obtain a Taylor expansion of the first prediction expression at a representative point within the range of the value of the explanatory variable;

obtain a Taylor expansion of the theoretical expression at the representative point;

calculate similarity between coefficients of the Taylor expansion of the first prediction expression and coefficients of the Taylor expansion of the theoretical expression; and set the first conviction degree based on the calculated similarity, wherein higher similarity results in a higher first conviction degree; and iteratively update the first parameters to increase both the precision and the first conviction degree until a combined objective function satisfies a convergence criterion.

19. A generation method, which is executed by a generation apparatus, the generation apparatus including a processor configured to execute a program, and a storage device configured to store the program, the generation apparatus being configured to access:

a set of pieces of learning data each being a combination of a value of an explanatory variable and a value of an objective variable;

a function family list including, of functions each indicating a physical law and an attribute of each of the functions, at least the functions; and search range limiting information for limiting a search range of the function family list, wherein the generation method generates interpretable prediction expressions by constraining a search space to physically meaningful functions from the function family list that indicate physical laws, wherein the function family list is pre-configured based on domain-specific knowledge of physical laws applicable to a target prediction domain, to thereby address a technical problem of black-box machine learning models by producing prediction rules that are both accurate and explainable, the generation method comprising executing, by the processor:

first generation processing of generating a first prediction expression that is interpretable by setting a first parameter for the explanatory variable to a first function included in the function family list, wherein the first function indicates a physical law, and wherein generating the first prediction expression comprises constraining the search space to the physically meaningful functions from the function family list;

first calculation processing of calculating, based on the search range limiting information, a first conviction degree relating to the first prediction expression generated through the first generation processing, wherein the first conviction degree is calculated as a measure of consistency between the first prediction expression and domain-specific knowledge represented by the search range limiting information, wherein calculating the first conviction degree comprises evaluating conformity of the first prediction expression to physical law constraints specified in the search range limiting information, and wherein the first conviction degree is calculated independently of prediction accuracy of the first prediction expression, wherein the domain-specific knowledge comprises at least one of physical laws and theoretical expressions specified in the search range limiting information; and first output processing of outputting the first prediction expression and the first conviction degree calculated through the first calculation processing only when the first prediction expression satisfies both (i) a precision requirement based on prediction accuracy measured against the objective variable and (ii) a conviction degree threshold indicating that the first prediction expression conforms to the physical law constraints within a predetermined tolerance, wherein the precision requirement and the conviction degree threshold are independently evaluated.

20. A computer-readable non-transitory recording medium having recorded thereon a generation program for causing a processor to generate a rule for predicting data, the processor being configured to access:

a set of pieces of learning data each being a combination of a value of an explanatory variable and a value of an objective variable;

a function family list including, of functions each indicating a physical law and an attribute of each of the functions, at least the functions; and search range limiting information for limiting a search range of the function family list, wherein the generation program causes the processor to generate interpretable prediction expressions by constraining a search space to physically meaningful functions from the function family list that indicate physical laws, wherein the function family list is pre-configured based on domain-specific knowledge of physical laws applicable to a target prediction domain, to thereby address a technical problem of black-box machine learning models by producing prediction rules that are both accurate and explainable, the generation program causing the processor to execute:

first generation processing of generating a first prediction expression that is interpretable by setting a first parameter for the explanatory variable to a first function included in the function family list, wherein the first function indicates a physical law, and wherein generating the first prediction expression comprises constraining the search space to the physically meaningful functions from the function family list;

first calculation processing of calculating, based on the search range limiting information, a first conviction degree relating to the first prediction expression generated through the first generation processing, wherein the first conviction degree is calculated as a measure of consistency between the first prediction expression and domain-specific knowledge represented by the search range limiting information, wherein calculating the first conviction degree comprises evaluating conformity of the first prediction expression to physical law constraints specified in the search range limiting information, and wherein the first conviction degree is calculated independently of prediction accuracy of the first prediction expression, wherein the domain-specific knowledge comprises at least one of physical laws and theoretical expressions specified in the search range limiting information; and first output processing of outputting the first prediction expression and the first conviction degree calculated through the first calculation processing only when the first prediction expression satisfies both (i) a precision requirement based on prediction accuracy measured against the objective variable and (ii) a conviction degree threshold indicating that the first prediction expression conforms to the physical law constraints within a predetermined tolerance, wherein the precision requirement and the conviction degree threshold are independently evaluated.

\* \* \* \* \*